United States Patent
Cho et al.

(10) Patent No.: US 10,410,077 B2
(45) Date of Patent: Sep. 10, 2019

(54) METHOD AND APPARATUS FOR DETECTING ERROR IN GESTURE RECOGNITION

(71) Applicant: SAMSUNG ELECTRONICS CO., LTD., Suwon-si (KR)

(72) Inventors: Baek Hwan Cho, Seoul (KR); Jooyeon Woo, Hwaseong-si (KR); Keun Joo Park, Seoul (KR); EricHyunsurk Ryu, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 348 days.

(21) Appl. No.: 15/084,656

(22) Filed: Mar. 30, 2016

(65) Prior Publication Data
US 2017/0124410 A1 May 4, 2017

(30) Foreign Application Priority Data
Oct. 30, 2015 (KR) ........................ 10-2015-0151652

(51) Int. Cl.
| | | |
|---|---|---|
| G09G 5/00 | (2006.01) |
| G06K 9/03 | (2006.01) |
| G06F 3/01 | (2006.01) |
| G06K 9/00 | (2006.01) |
| G06K 9/20 | (2006.01) |

(52) U.S. Cl.
CPC ............. *G06K 9/036* (2013.01); *G06F 3/017* (2013.01); *G06K 9/00335* (2013.01); *G06K 9/00355* (2013.01); *G06K 9/00362* (2013.01); *G06K 9/03* (2013.01); *G06K 9/2054* (2013.01)

(58) Field of Classification Search
CPC ............... G06K 9/036; G06K 9/00335; G06K 9/00362; G06F 3/017; G06F 3/04883
See application file for complete search history.

(56) References Cited

U.S. PATENT DOCUMENTS

| | | | |
|---|---|---|---|
| 2005/0275638 A1 | 12/2005 | Kolmykov-Zotov et al. | |
| 2011/0173204 A1* | 7/2011 | Murillo | G06F 3/017 707/741 |
| 2012/0044139 A1 | 2/2012 | Kim et al. | |
| 2012/0162409 A1* | 6/2012 | Setiawan | G06F 3/011 348/135 |
| 2014/0351753 A1 | 11/2014 | Shin et al. | |
| 2015/0070277 A1* | 3/2015 | Kimura | G06K 9/00355 345/156 |
| 2015/0160737 A1 | 6/2015 | Jeong et al. | |

FOREIGN PATENT DOCUMENTS

| | | |
|---|---|---|
| KR | 10-2012-0051211 A | 5/2012 |
| KR | 10-1511146 B1 | 4/2015 |
| KR | 10-2015-0072206 A | 6/2015 |

\* cited by examiner

*Primary Examiner* — Adam R. Giesy
(74) *Attorney, Agent, or Firm* — Sughrue Mion, PLLC

(57) ABSTRACT

A method and apparatus for detecting an error in gesture recognition are provided. The method includes sensing whether an effective gesture occurs in a first area for gesture recognition of a user; setting a second area and sensing an occurrence of an event due to a movement of the user, based on a result of the sensing in the first area; and detecting the error in the gesture recognition based on whether the occurrence of the event is sensed in the second area.

25 Claims, 15 Drawing Sheets

METHOD AND APPARATUS FOR DETECTING ERROR IN GESTURE RECOGNITION

CROSS-REFERENCE TO RELATED APPLICATION

This application claims priority from Korean Patent Application No. 10-2015-0151652, filed on Oct. 30, 2015, in the Korean Intellectual Property Office, the disclosure of which is incorporated by reference herein in its entirety.

BACKGROUND

1. Field

Methods and apparatuses consistent with exemplary embodiments relate to detecting an error in gesture recognition.

2. Description of the Related Art

A dynamic vision sensor (DVS) may detect only an outline of a moving object, because the DVS responds to a change in light. Accordingly, high-speed processing is possible due to a relatively small quantity of data, and privacy may be maintained due to detection of the outline of the object. Also, low power may be consumed. However, there is a disadvantage in that, when only the outline is detected, it is difficult to accurately track a body part of a user, which may lead to an error in recognition.

When a location of a user or a location of a hand for gesture recognition is not exactly found, there is another disadvantage in that a corresponding graphical user interface (GUI) may not properly operate, which may be confusing to a user who expects a control through gesture recognition.

SUMMARY

Exemplary embodiments may address at least the above disadvantages and/or disadvantages and other disadvantages not described above. Also, the exemplary embodiments are not required to overcome the disadvantages described above, and an exemplary embodiment may not overcome any of the disadvantages described above.

According to an aspect of an exemplary embodiment, there is provided a method of detecting an error in gesture recognition, the method comprising sensing whether an effective gesture occurs in a first area for gesture recognition of a user; setting a second area and sensing an occurrence of an event due to a movement of the user, based on a result of the sensing in the first area; and detecting the error in the gesture recognition based on whether the occurrence of the event is sensed in the second area.

The sensing whether the effective gesture occurs in the first area may comprise determining whether a movement occurs in the first area; and determining whether the movement is the effective gesture.

The determining of whether the movement is the effective gesture may comprise determining, using a pre-trained image classifier, whether the movement is the effective gesture.

The setting the second area may comprise identifying at least a part of a body of the user; setting a reference point in the identified part of the body; and setting the second area based on the reference point.

The identifying may comprise identifying, using a pre-trained image classifier, at least a part of the body of the user.

The setting the second area may comprise identifying at least a part of a body of the user; storing a movement trajectory by tracking a movement of the identified part of the body; and setting the second area based on the movement trajectory.

The detecting may comprise, when the occurrence of the event is sensed in the second area, detecting the error in the gesture recognition.

The detecting may comprise measuring a locomotion or a movement amount of an object corresponding to the event in the second area; and ignoring the occurrence of the event when the locomotion or the movement amount is greater than a first threshold or is less than a second threshold.

The detecting may comprise determining whether a movement of an object corresponding to the event in the second area has a regularity; and ignoring the occurrence of the event when the movement of the object is determined to have the regularity.

The first area may be smaller than the second area.

The method may further comprise feeding back to the user the error in the gesture recognition.

The feeding back may comprise feeding back to the user the error in the gesture recognition based on at least one of an image message, a voice message and an animation.

The method may further comprise, after the feeding back, resetting a location of a shaken object by scanning the second area.

The method may further comprise, after the feeding back, visually providing the user with at least one of the first area, a location of the user and a surrounding environment of the user.

The visually providing may comprise providing the first area in a preset form; and providing the location and the surrounding environment of the user using at least one of a static image generation scheme and a micro-vibration providing scheme.

The static image generation scheme may be used to extract a static pattern corresponding to the location and the surrounding environment of the user based on location information and time information included in an event signal output by an event-based sensor in response to a dynamic input.

The micro-vibration providing scheme may be used to provide a micro-vibration to an event-based sensor, to generate a dynamic input corresponding to the location and the surrounding environment of the user.

The visually providing may comprise overlaying a playing screen with at least one of the first area, the location of the user and the surrounding environment of the user, or visually providing at least one of the first area, the location of the user and the surrounding environment of the user through a screen change.

According to another aspect of an exemplary embodiment, there is provided a computer program embodied on a non-transitory computer readable medium, the computer program being configured to control a processor to perform the above method, through a combination with hardware.

According to another aspect of an exemplary embodiment, there is provided an apparatus for detecting an error in gesture recognition, the apparatus comprising a sensor configured to sense whether an effective gesture occurs in a first area for gesture recognition of a user; and a processor configured to set a second area and to sense an occurrence of an event in the second area due to a movement of the user based on a result of the sensing in the first area, and configured to detect an error in the gesture recognition based on whether the occurrence of the event is sensed in the second area.

According to another aspect of an exemplary embodiment, there is provided an apparatus for detecting an error in gesture recognition, the apparatus comprising a sensor; and at least one microprocessor configured to control the sensor to sense whether a gesture by a first body part occurs in a first area that is a portion of a field of view (FOV) of the sensor; and when a gesture is not sensed in the first area, redefine the first area based on a sensed position of a second body part that is larger than the first body part and re-sense whether a gesture occurs in the redefined area; and detect an error when a gesture is sensed in the redefined area.

The redefined area may be a portion of the first area.

The redefined area may be a portion of the FOV different than the first area.

The first body part may be a hand of a user, and the second body part may be a head of the user.

The first area may be redefined based on a movement trajectory of the second body part.

BRIEF DESCRIPTION OF THE DRAWINGS

The above and other aspects of exemplary embodiments will become apparent and more readily appreciated from the following detailed description of certain exemplary embodiments, taken in conjunction with the accompanying drawings of which.

DETAILED DESCRIPTION

Figure 1:
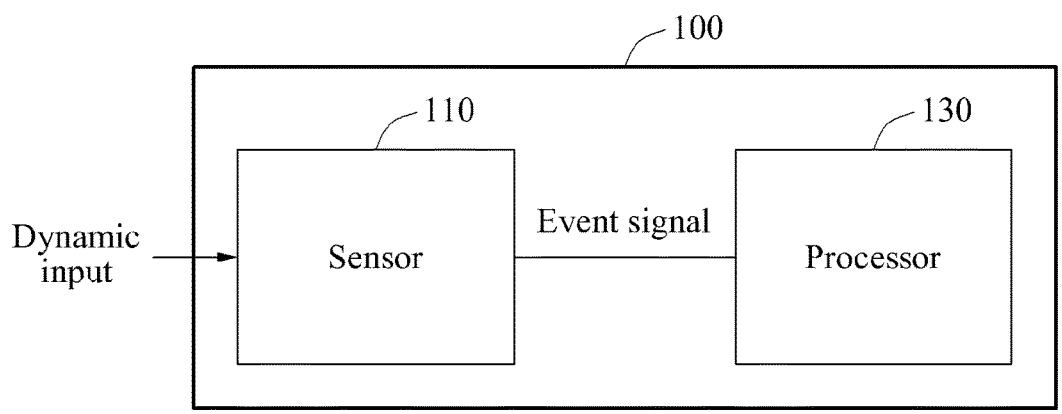
FIG. 1 is a block diagram illustrating a configuration of an apparatus for detecting an error in gesture recognition according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

Particular structural or functional descriptions of exemplary embodiments according to the concept of the present disclosure are merely intended for the purpose of describing exemplary embodiments and the exemplary embodiments may be implemented in various forms and should not be construed as being limited to those described in the present disclosure.

Although terms of "first" or "second" are used to explain various components, the components are not limited to the terms. These terms are used only to distinguish one component from another component. For example, a "first" component may be referred to as a "second" component, or similarly, the "second" component may be referred to as the "first" component within the scope of the right according to the concept of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (for example, "between" versus "directly between," or "adjacent" versus "directly adjacent").

As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

In the following description, exemplary embodiments may be used to detect an error in gesture recognition and feed back the error to a user. Exemplary embodiments may be implemented as various products, for example, tablet computers, smartphones, smart home appliances, intelligent vehicles or wearable devices. For example, exemplary embodiments may be employed to detect an error in gesture recognition and feed back the detected error, in apparatuses for performing an operation or instruction designated in advance by gesture recognition of a user (for example, a smart television (TV), a wearable device, a mobile device or an intelligent vehicle). Hereinafter, exemplary embodiments will be described in detail below with reference to the accompanying drawings, and like reference numerals refer to the like elements throughout.

FIG. 1 is a block diagram illustrating a configuration of an apparatus for detecting an error in gesture recognition according to an exemplary embodiment. Referring to FIG. 1, an apparatus 100 for detecting an error in gesture recognition includes a sensor 110 and a processor 130. Hereinafter, an apparatus for detecting an error in gesture recognition may be referred to as a "detecting apparatus."

The sensor 110 may sense whether an effective gesture occurs in a first area observed for gesture recognition of a user. The effective gesture may be preset. The first area may be referred to as an "observation area." The first area may be set based on an experience rule or a preset rule.

The sensor 110 may include, for example, an event-based sensor.

The event-based sensor may output an event signal in response to a dynamic input. The event signal may include time information and location information corresponding to the dynamic input.

The dynamic input may include an event to change light incident on at least one pixel in the event-based sensor. For example, the event may include an event associated with a change in an input. The event may include, for example, an event in which an intensity of incident light changes, an even in which a color of incident light changes, an event in which a volume of input sound changes, an event in which a frequency of input sound changes, or an event in which a strength of an input stimulation changes. Hereinafter, for convenience of description, the event-based sensor is assumed as an event-based vision sensor to sense an event in which an intensity of incident light changes; however, there is no limitation thereto. Accordingly, exemplary embodiments may also be applicable to various event-based sensors.

The location information may include an address indicating at least one pixel sensing the dynamic input among a plurality of pixels included in the event-based sensor. The time information may include a timestamp indicating a time at which the dynamic input is sensed by at least one pixel in the event-based sensor. Hereinafter, a process by which the event-based sensor generates an event signal will be further described.

The event-based sensor may include a plurality of sensing pixels. The event-based sensor may generate an event signal including identification information of an active pixel sensing an event among the plurality of sensing pixels. The sensor 110 may use a neuromorphic sensing scheme. For example, the event-based sensor may be implemented as a 128×128 array including sensing pixels with a size of 20×20 square micrometer (μm²).

The plurality of sensing pixels in the event-based sensor may sense an event, for example, an event in which an intensity of incident light changes. A sensing pixel that senses an event among the plurality of sensing pixels may be referred to as an "active pixel." The active pixel may generate an activation signal in response to an event being sensed.

The location information may include an address indicating at least one pixel sensing the dynamic input among a plurality of pixels included in the event-based sensor. The event-based sensor may generate identification information of the active pixel. For example, the event-based sensor may generate an event signal including an address to identify an active pixel based on an activation signal generated by the active pixel. The event-based sensor may asynchronously generate and output an event signal, and accordingly may operate at a high speed and low power in comparison to a frame-based vision sensor configured to scan all pixels for each frame.

The event-based sensor may generate an asynchronous address event (AE) signal based on active pixels. For example, when a change in a log intensity after a last event exceeds an upper threshold the event-based sensor may generate an ON event signal, or when a change in a log intensity after a last event exceeds a lower threshold, the event-based sensor may generate an OFF event signal. The event-based sensor may additionally generate timing information of an event signal. The event-based sensor may interface with a synchronous system based on the timing information. Due to a low density and low latency of an output of the event-based sensor, the event-based sensor may be used for a high-speed object tracking application having feedback of a quick response. The high-speed object tracking application may include, for example, high-speed robotics.

The event-based sensor may output an event signal. The event signal output from an event-based vision sensor may include both an event signal corresponding to a real activity and an event signal corresponding to a background activity. The event signal corresponding to the background activity may be generated by a junction leakage current or thermal noise occurring in switches connected to floating nodes in sensing pixels of the event-based sensor.

To perform filtering of the event signal corresponding to the background activity, the event-based sensor may generate a pass flag to identify event signals that are spatiotemporally associated with each other. Thus, the event-based sensor may reduce a communication and computation load, and may enhance an information rate.

The event-based sensor may use a power-gating scheme. The power-gating scheme may be a scheme of minimizing power consumption by activating only a communication circuit and a threshold detection circuit corresponding to a sensing pixel that senses an event. Also, the event-based sensor may use a correlation filter chip. By using the correlation filter chip, the event-based sensor may be applicable to an embedded neuromorphic visual and auditory system having a low power consumption and quick response.

The event-based sensor may generate a timestamp indicating a time at which the dynamic input is sensed by an active pixel. The active pixel may generate an activation signal in response to an event being sensed. For example, the event-based sensor may generate a timestamp based on a time at which an activation signal is generated.

The processor 130 may set a second area to sense an occurrence of an event due to a movement of a user, based on a sensing result of the sensor 110. The second area may be referred to as an "event monitoring area." The processor 130 may detect an error in the gesture recognition based on whether the occurrence of the event is sensed in the second area. Also, the sensor 110 may sense the occurrence of the event in the second area set by the processor 130.

According to an exemplary embodiment, when the second area is set in advance, the processor 130 may update the second area, or may set a new area as the second area.

The processor 130 may be implemented by a microprocessor, a controller, a central processing unit (CPU), an arithmetic logic unit (ALU), a digital signal processor (DSP), a field programmable gate array (FPGA), a programmable logic unit (PLU), one or more general-purpose or special-purpose computers capable of responding to and executing instructions, or various combinations thereof.

For convenience of description, an operation and a structure of the detecting apparatus 100 will be described; however, exemplary embodiments are not limited thereto. For example, exemplary embodiments may be applicable to various computing apparatuses including detecting apparatuses, mobile devices, or various security apparatuses. The mobile devices may include, for example, smart TVs, smartphones or wearable devices.

The processor 130 may generate a timestamp in response to the event signal being received from the sensor 110.

The processor 130 may extract a static pattern associated with the dynamic input, based on the event signal. As described above, the dynamic input may include an event to change light incident on at least one pixel in the event-based sensor. The static pattern may correspond to an appearance of an object associated with the dynamic input. For example, the dynamic input may include a motion of an object, and the static pattern may correspond to an appearance of the object in a state in which the motion stops. Hereinafter, a process by which the processor 130 extracts the static pattern will be further described The processor 130 may store the location information and the time information based on the event signal, and may extract the static pattern based on the stored location information and the stored time information. The location information and the time information may be stored in a memory in the form of a timestamp map. The detecting apparatus 100 may include a memory to store a timestamp map. An example of the timestamp map will be further described with reference to FIGS. 11A and 11B.

In addition, the processor 130 may perform at least one of the methods described with reference to FIGS. 1 through 15. The processor 130 may execute a program and may control the detecting apparatus 100. A program code executed by the processor 130 may be stored in a memory (not shown). The detecting apparatus 100 may be connected to an external device (for example, a personal computer (PC) or a network) via an input/output device (not shown), and may exchange data with the external device.

At least one of the methods described with reference to FIGS. 1 through 15 may be implemented as an application or a gesture recognition engine that operates in a process included in a tablet, a smartphone, a smart TV or a wearable device, or may be implemented in the form of a chip and included in a smartphone, a smart TV, a wearable device, an intelligent vehicle, and other various audio-visual (AV) apparatuses.

Figure 2:
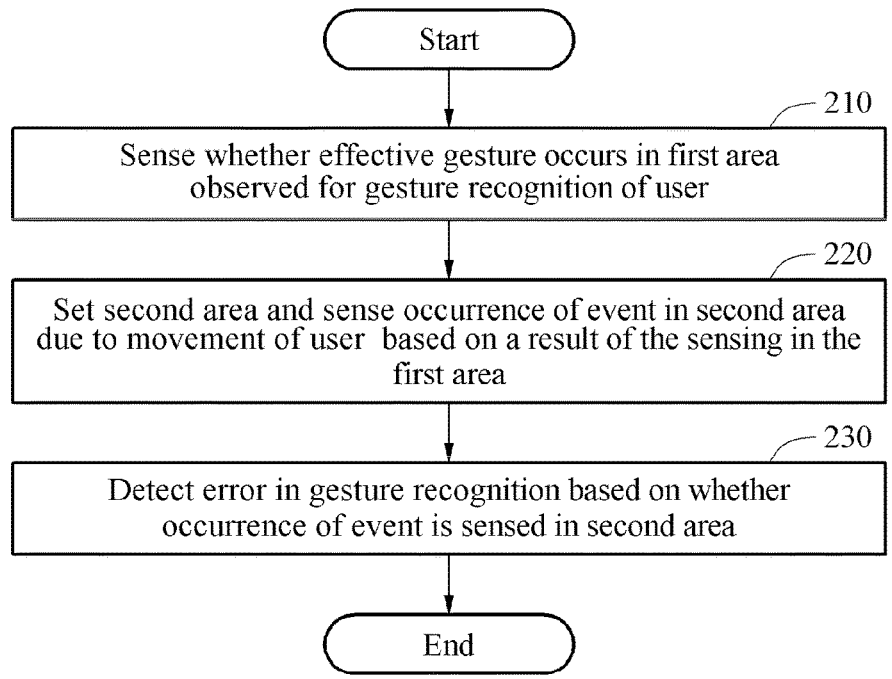
FIG. 2 is a flowchart illustrating an example of a method of detecting an error in gesture recognition according to an exemplary embodiment.

FIG. 2 is a flowchart illustrating a method of detecting an error in gesture recognition according to an exemplary embodiment. Referring to FIG. 2, in operation 210, a detecting apparatus according to an exemplary embodiment senses whether an effective gesture occurs in a first area observed for gesture recognition of a user. The effective gesture may be preset. In operation 210, the detecting apparatus may determine whether a movement occurs in the first area, and may determine whether the movement is the effective gesture. The effective gesture may be a gesture set in advance for control by the gesture recognition, and may include, for example, a gesture of drawing a circle to the right to change a channel in an AV apparatus, a gesture of lowering a hand to turn off a TV, or a gesture of moving a hand from right to left to turn down sound.

The detecting apparatus may determine, using a pre-trained image classifier, whether the movement is the effective gesture. For example, a movement of a hand to move a control cursor on a screen of a smart TV may be determined as the effective gesture.

In operation 220, the detecting apparatus sets a second area and senses an occurrence of an event due to a movement of the user in the second area, based on a result of the sensing in the first area. For example, when the effective gesture is determined not to occur in the first area, the detecting apparatus may set the second area and sense the occurrence of the event in the second area. The occurrence of the event may include the occurrence of an effective gesture. That is, the event may include an effective gesture.

In operation 230, the detecting apparatus detects an error in the gesture recognition based on whether the occurrence of the event is sensed in the second area.

In an example, when a large number of movements are sensed in areas other than the first area using a dynamic vision sensor (DVS) even though an effective command is not sensed in the first area, or when a movement sensed in the first area does not correspond to an effective command, the detecting apparatus may determine that an error in gesture recognition occurs. In this example, the large number of movements may be sensed in the other areas when the detecting apparatus fails to identify a location of a body part of a user and observes another location even though the user performs a gesture to control an AV apparatus, for example, a smart TV.

In another example, when a movement captured in another area is enabled by a neighboring object or another user, the detecting apparatus may incorrectly determine the movement as a movement enabled by the user even though the movement is not enabled by the user.

As described above, when the effective gesture does not occur in the first area, the second area may be appropriately set, and whether an effective event occurs may be determined in the second area. Thus, it is possible to detect an error in gesture recognition.

Figure 3:
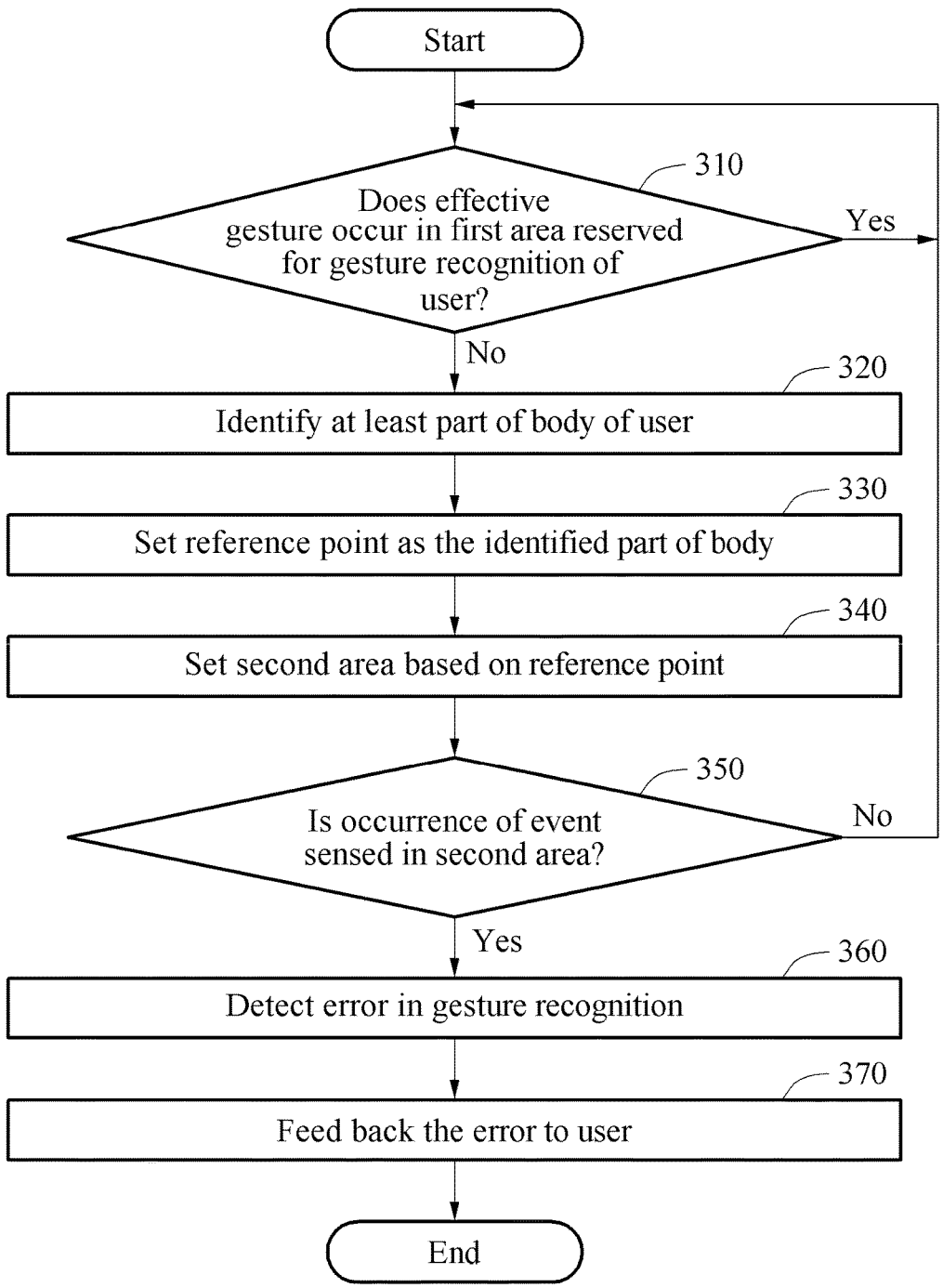
FIG. 3 is a flowchart illustrating another example of a method of detecting an error in gesture recognition according to an exemplary embodiment.
Figure 4:
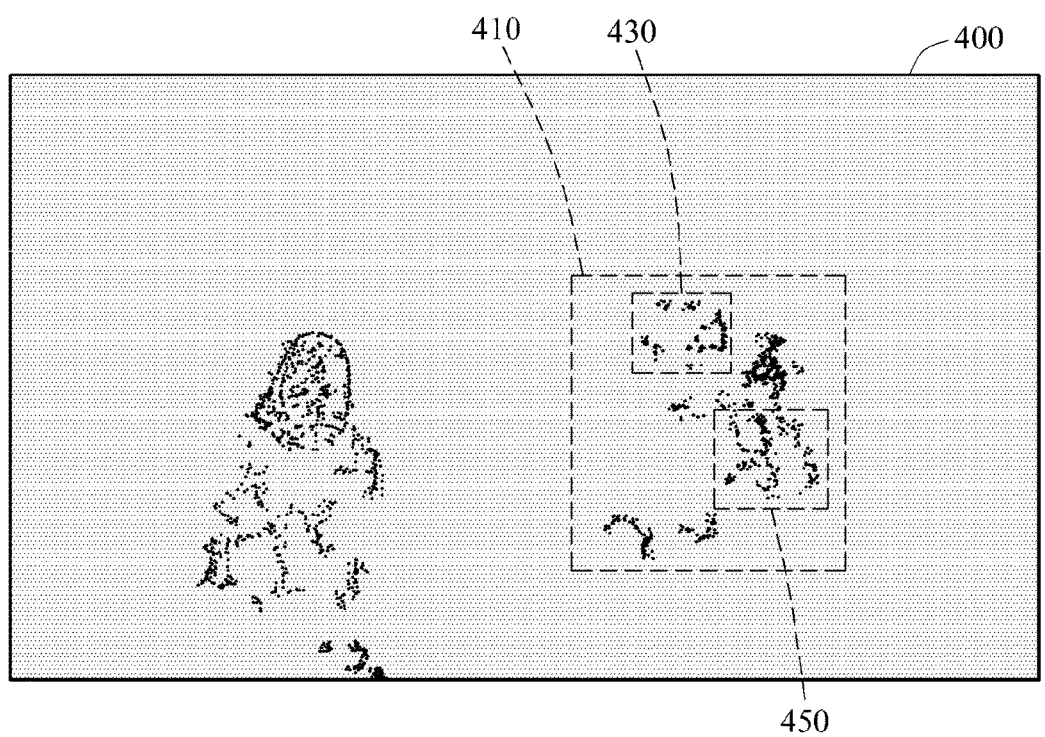
FIG. 4 is a diagram illustrating a first area, a second area and a reference point according to an exemplary embodiment.

FIG. 3 is a flowchart illustrating another example of a method of detecting an error in gesture recognition according to an exemplary embodiment, and FIG. 4 is a diagram illustrating a first area, a second area and a reference point according to an exemplary embodiment.

Referring to FIGS. 3 and 4, in operation 310, a detecting apparatus according to an exemplary embodiment determines whether an effective gesture occurs in a first area reserved for gesture recognition of a user. The first area may correspond to, for example, an area 410 shown in FIG. 4. The area 410 may correspond to an area reserved for the gesture recognition of the user in an area 400 corresponding to an entire field of view (FOV). The area reserved for the gesture recognition of the user may be a portion of the FOV in which the detecting apparatus expects to observe the effective gesture. The area reserved for the gesture recognition of the user may be set in advance, or may be set based on, for example, prior sensed gestures of the user. When the effective gesture is determined to occur in the first area in operation 310, the detecting apparatus may repeatedly perform operation 310 until the effective gesture does not occur.

When the effective gesture is determined not to occur in the first area in operation 310, the detecting apparatus may identify at least a part of a body of the user in operation 320. For example, the detecting apparatus may use a pre-trained image classifier to identify at least a part of a body of the user. The image classifier may be trained in advance to identify, for example, a face, a hand or a torso of the user. The detecting apparatus may identify the at least a part of the body of the user in the first area. However, this is only an example, and the detecting apparatus may identify the at least a part of the body of the user outside the first area, such as in another area within in the field of view (FOV) (e.g., area 400 in FIG. 4).

In operation 330, the detecting apparatus sets a reference point as the identified part of the body. The reference point may include a reference area, and may correspond to, for example, a head, a hand, a torso, a central point of the head, a central point of the hand and a central point of the torso of the user. The reference point may correspond to, for example, an area 430. The area 430 may be, for example, an area corresponding to the head of the user. As discussed above, the area 430 may be within the area 410 as shown in FIG. 4. However, this is only an example and the area 430 may be outside of the area 410 and within the FOV (e.g., area 400 in FIG. 4).

In operation 340, the detecting apparatus sets a second area and senses an occurrence of an event due to a movement of the user based on the reference point. The detecting apparatus may estimate a location of a body part, for example, a hand of the user based on the reference point, and may set the second area. The second area may be, for example, an area 450. The area 450 may be an area estimated as a location of a hand based on an area corresponding to a last location of the head of the user, or an area around a reference point corresponding to the head. Also, the area 450 may be an area corresponding to a range in which the user is movable based on the head of the user. Accordingly, it is possible to identify a user to be sensed by the second area set based on the reference point despite a plurality of users in an FOV of an event-based sensor.

In operation 350, the detecting apparatus determines whether an occurrence of an event is sensed in the second area. When the occurrence of the event is determined not to be sensed in the second area in operation 350 (operation 350, NO), the detecting apparatus may perform operation 310.

When the occurrence of the event is determined to be sensed in the second area in operation 350 (operation 350, YES), the detecting apparatus may detect an error in the gesture recognition in operation 360. For example, when an error in gesture recognition of a user occurs due to an unknown reason while an AV apparatus operates based on the gesture recognition, an effective gesture may not be recognized in the area 410. In this example, the detecting apparatus may search for the area 450 estimated as a location of a hand of the user based on the area 430 corresponding to a reference point of a head of the user, and may determine whether an occurrence of an event is sensed. The detecting apparatus may track a movement of the hand by limiting a monitoring area to the area 450, despite movements of other users, to address the error in the gesture recognition.

In operation 370, the detecting apparatus feeds back the error to the user. The detecting apparatus may feed back to the user the error in the gesture recognition using, for example, an image message, a video message and/or an animation. A method of feeding back an error in gesture recognition to a user will be further described with reference to FIGS. 8, 9 and 10.

Figure 5:
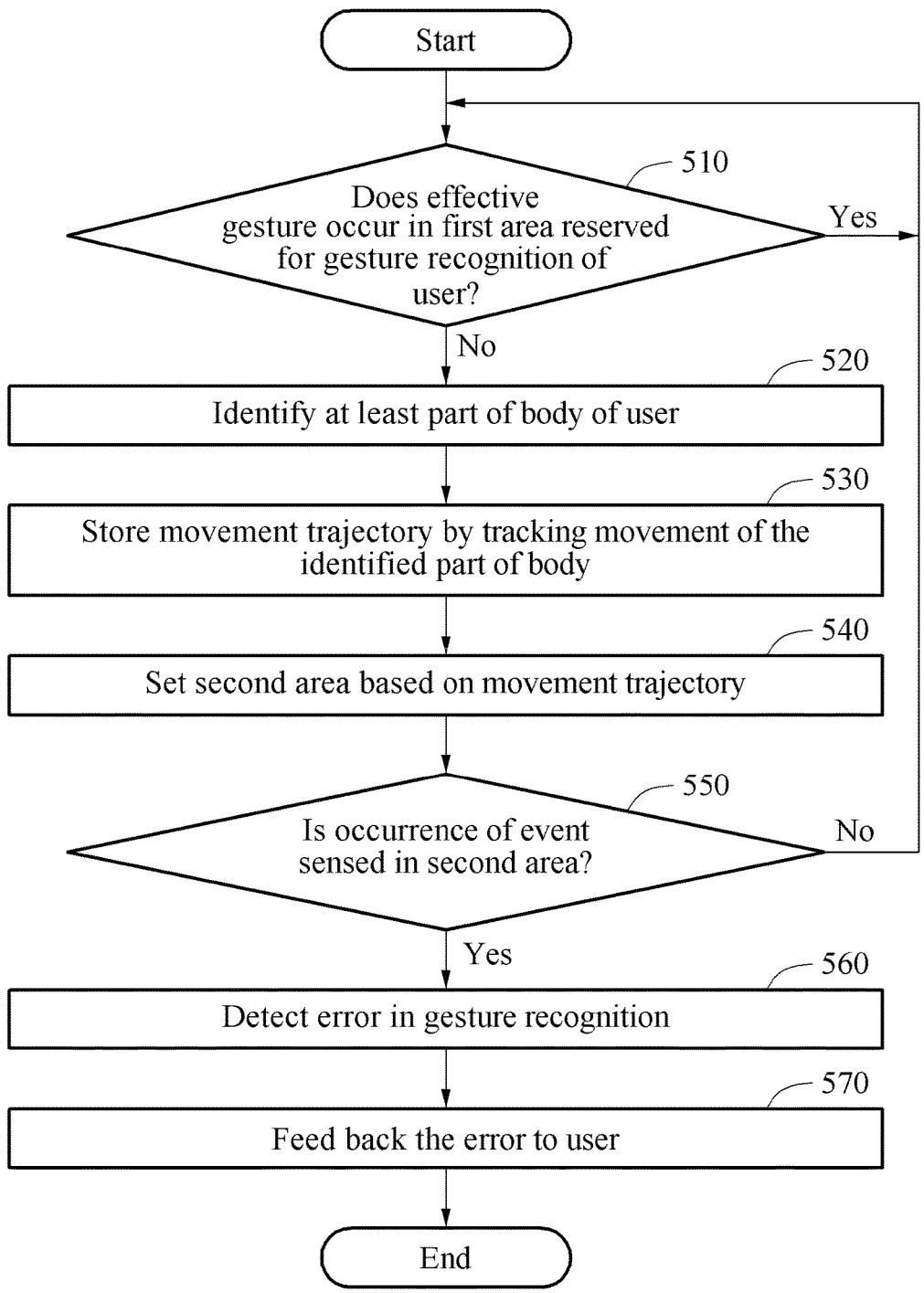
FIG. 5 is a flowchart illustrating still another example of a method of detecting an error in gesture recognition according to an exemplary embodiment.
Figure 6:
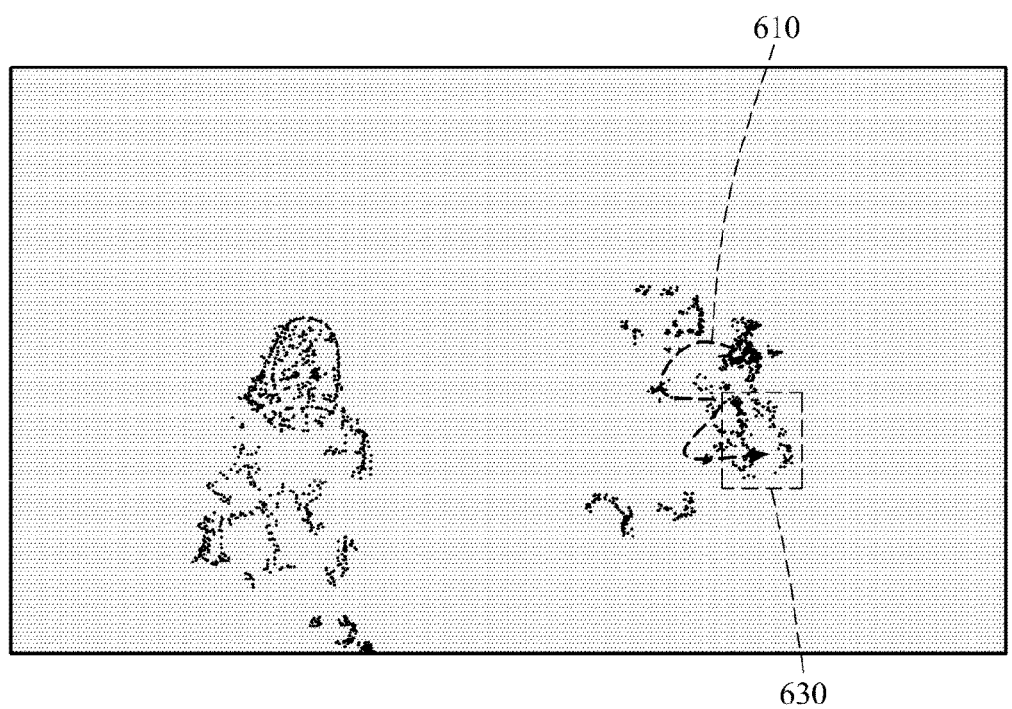
FIG. 6 is a diagram illustrating a second area and a movement trajectory obtained by tracking a movement of a part of a body of a user according to an exemplary embodiment.

FIG. 5 is a flowchart illustrating still another example of a method of detecting an error in gesture recognition according to an exemplary embodiment, and FIG. 6 is a diagram illustrating a second area and a movement trajectory obtained by tracking a movement of a part of a body of a user according to an exemplary embodiment.

Referring to FIGS. 5 and 6, in operation 510, a detecting apparatus according to an exemplary embodiment determines whether effective gesture occurs in a first area reserved for gesture recognition of a user. The effective gesture may be preset. When the effective gesture is determined to occur in the first area in operation 510 (operation 510, YES), the detecting apparatus may repeatedly perform operation 510 until the effective gesture does not occur.

When the effective gesture is determined not to occur in the first area in operation 510 (operation 510, NO), the detecting apparatus may identify at least a part of the body of the user in operation 520.

In operation 530, the detecting apparatus stores a movement trajectory by tracking a movement of the identified part of the body. For example, the detecting apparatus may calculate a movement trajectory by tracking a movement corresponding to a location of an identified hand of the user for a period of time, such as, for example, five seconds, and may store the calculated movement trajectory. The movement trajectory may be, for example, a movement trajectory 610 of FIG. 6.

In operation 540, the detecting apparatus sets a second area based on the movement trajectory. For example, the detecting apparatus may set, as a second area 630, an area in a range associated with the movement trajectory 610, or an area having a correlation with the movement trajectory 610, based on the movement trajectory 610, and may monitor the set area. The range may be predetermined, and the correlation may be predetermined.

Operations 550, 560 and 570 may be the same as operations 350, 360 and 370 of FIG. 3, and accordingly description thereof is not repeated here.

Figure 7:
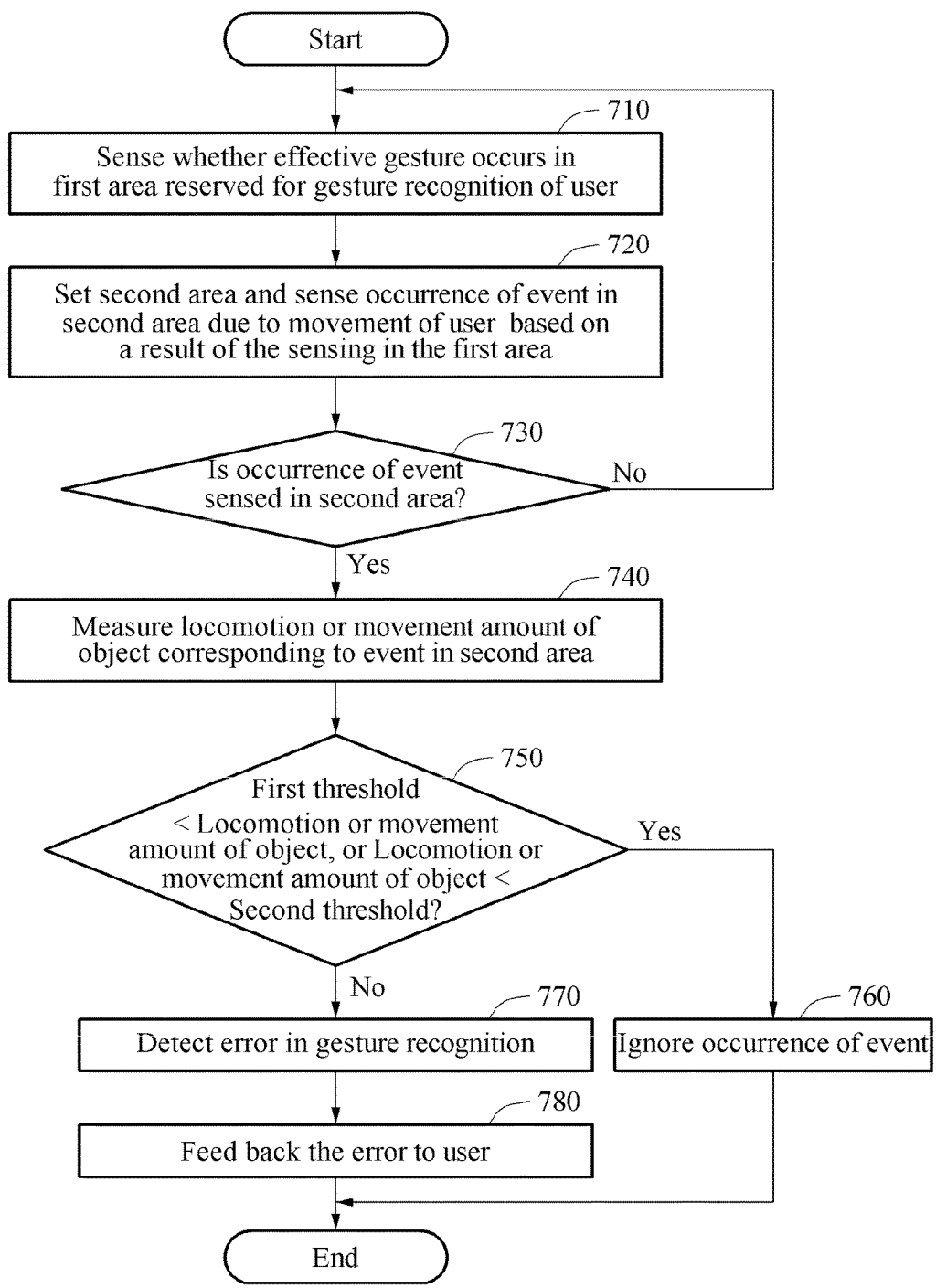
FIG. 7 is a flowchart illustrating yet another example of a method of detecting an error in gesture recognition according to an exemplary embodiment.

FIG. 7 is a flowchart illustrating yet another example of a method of detecting an error in gesture recognition according to an exemplary embodiment. Referring to FIG. 7, in operation 710, a detecting apparatus according to an exemplary embodiment senses whether effective gesture occurs in a first area reserved for gesture recognition of a user. The effective gesture may be preset. In operation 720, the detecting apparatus sets a second area and senses an occurrence of an event in the second area due to a movement of the user, based on a sensing result in the first area.

In operation 730, the detecting apparatus determines whether the occurrence of the event is sensed in the second area. When the occurrence of the event is determined not to be sensed in the second area in operation 730 (operation 730, NO), the detecting apparatus may sense whether the effective gesture occurs in the first area in operation 710.

When the occurrence of the event is determined to be sensed in the second area in operation 730 (operation 730, YES), the detecting apparatus may measure a locomotion or a movement amount of an object corresponding to the event in the second area in operation 740.

In operation 750, the detecting apparatus determines whether the measured locomotion or the measured movement amount is greater than a first threshold, or is less than a second threshold. The first and second thresholds may each be preset. The first threshold may be, for example, a value corresponding to a locomotion or a movement amount of an active pet, for example, a puppy or a chick. The second threshold may be, for example, a value of "0" or close to "0" corresponding to a movement amount of a mechanical movement of an object, for example, an electric fan or robot cleaner.

When the measured locomotion or the measured movement amount is determined to be greater than the first threshold or to be less than the second threshold in operation 750 (operation 750, YES), the detecting apparatus may ignore the occurrence of the event in operation 760. For example, when an occurrence of an event due to an active pet or an object with a mechanical movement, for example, a robot cleaner or an electric fan, is sensed in the second area, the event may be ignored because the event does not correspond to a movement of the user for gesture recognition. When a locomotion or a movement amount of an object that causes an event to occur has a value exceeding the first threshold or a value less than the second threshold, the event may be determined not to be generated by the user and an occurrence of the event may be ignored.

When the measured locomotion or the measured movement amount is determined to be equal to or less than the first threshold, or to be equal to or greater than the second threshold in operation 750 (operation 750, NO), the detecting apparatus may detect an error in the gesture recognition in operation 770. In operation 780, the detecting apparatus feeds back to the user the error in the gesture recognition.

According to an exemplary embodiment, the detecting apparatus may determine whether a movement of an object corresponding to an event in the second area has a regularity. For example, the detecting apparatus may analyze a frequency of the movement of the object to determine whether the movement of the object has a periodic movement that occurs with a certain frequency or periodicity. When the movement of the object is determined to have the regularity, the movement of the object may be a movement by a fan blade of an electric fan, a fan of an air conditioner, or other mechanical motions. When the movement of the object has the regularity, the detecting apparatus may ignore the occurrence of the event.

Also, according to an exemplary embodiment, when an occurrence of an event is sensed in the second area, the detecting apparatus may determine, using a pre-trained image classifier, whether an image of the second area represents a shape of a body part, for example, a hand, of a user. When the image is determined not to represent the hand, the detecting apparatus may ignore the occurrence of the event.

Figure 8:
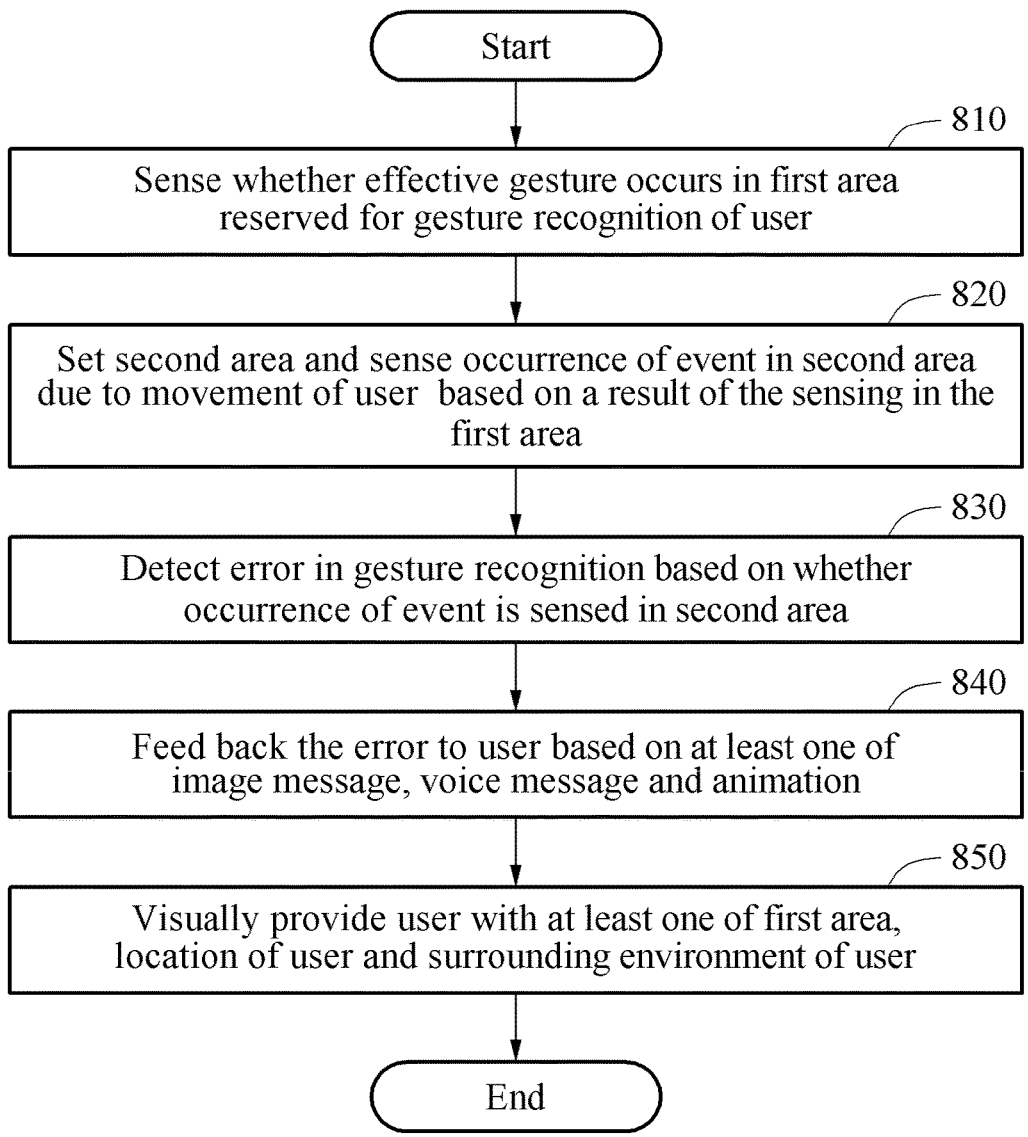
FIG. 8 is a flowchart illustrating a method of detecting an error in gesture recognition and feeding back the error to a user according to an exemplary embodiment.

FIG. 8 is a flowchart illustrating a method of detecting an error in gesture recognition and feeding back the error to a user according to an exemplary embodiment. Operations 810, 820 and 830 of FIG. 8 may be the same as operations 210, 220 and 230 of FIG. 2, and accordingly description thereof is not repeated here.

In operation 840, a detecting apparatus according to an exemplary embodiment feeds back an error in gesture recognition detected in operation 830 to the user based on at least one of an image message, a voice message and an animation. An example in which the detecting apparatus feeds back an error in gesture recognition to a user is described with reference to FIG. 9.

When the error is fed back, the detecting apparatus may reset a location of a shaken object by scanning the second area.

In operation 850, the detecting apparatus visually provides the user with at least one of a first area, a location of the user and a surrounding environment of the user. For example, the detecting apparatus may overlay a playing screen with at least one of the first area, the location of the user and the surrounding environment of the user, or may visually provide at least one of the first area, the location of the user and the surrounding environment of the user through a screen change. An example of a screen visually provided to a user by the detecting apparatus during or after feedback is described with reference to FIG. 10.

Figure 9:
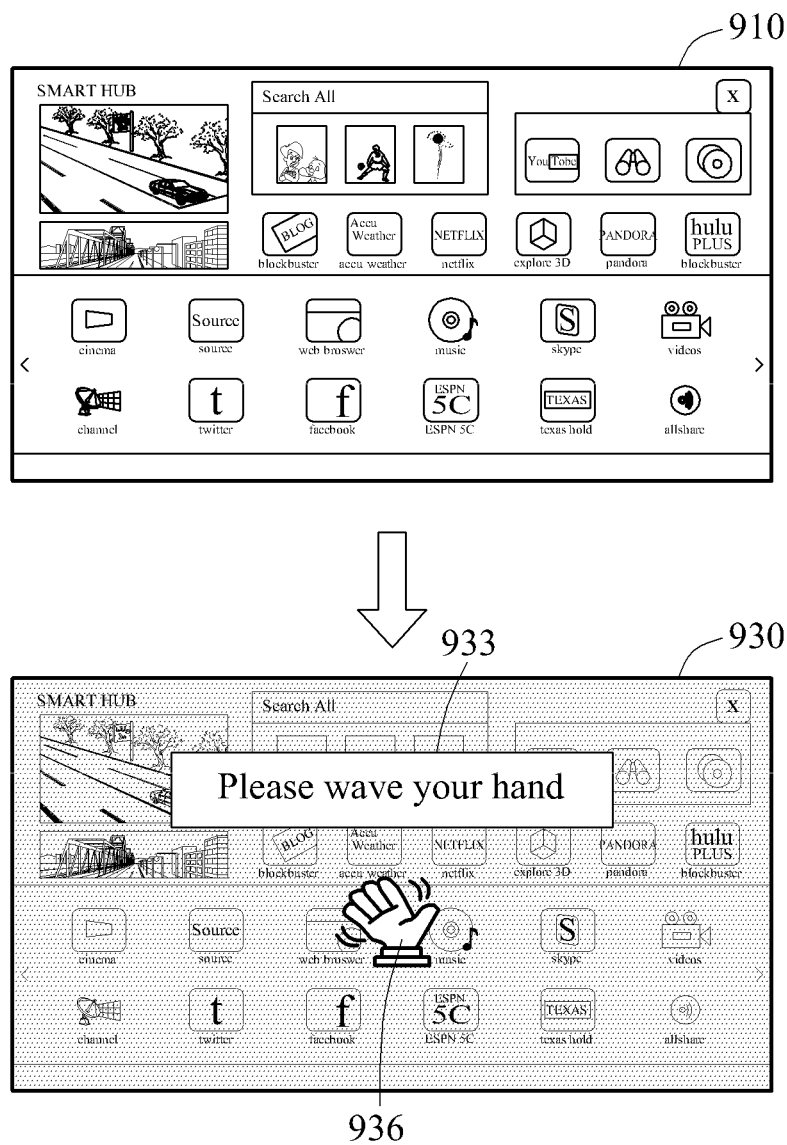
FIG. 9 is a diagram provided to explain a method of feeding back to a user an error in gesture recognition according to an exemplary embodiment.

FIG. 9 is a diagram provided to explain a method of feeding back to a user an error in gesture recognition according to an exemplary embodiment. FIG. 9 illustrates a playing screen 910, and a changed screen 930.

When an error in gesture recognition is detected when the playing screen 910 is being displayed, a detecting apparatus may display a changed screen 930, in which an image message 933 including a text stating, for example, "Please wave your hand" and/or an animation 936 showing a gesture of shaking a hand is overlaid over a greyed out playing screen 910. The detecting apparatus may notify the user of detection of the error in the gesture recognition through feedback based on the image message 933 displayed on the changed screen 930, a voice message and/or an animation 936.

The user may recognize the fed-back error and may re-perform an effective gesture for the gesture recognition, to control an AV apparatus based on the gesture recognition. Also, the detecting apparatus may recognize again a location of a shaken object by scanning an entire FOV of an event-based sensor.

Figure 10:
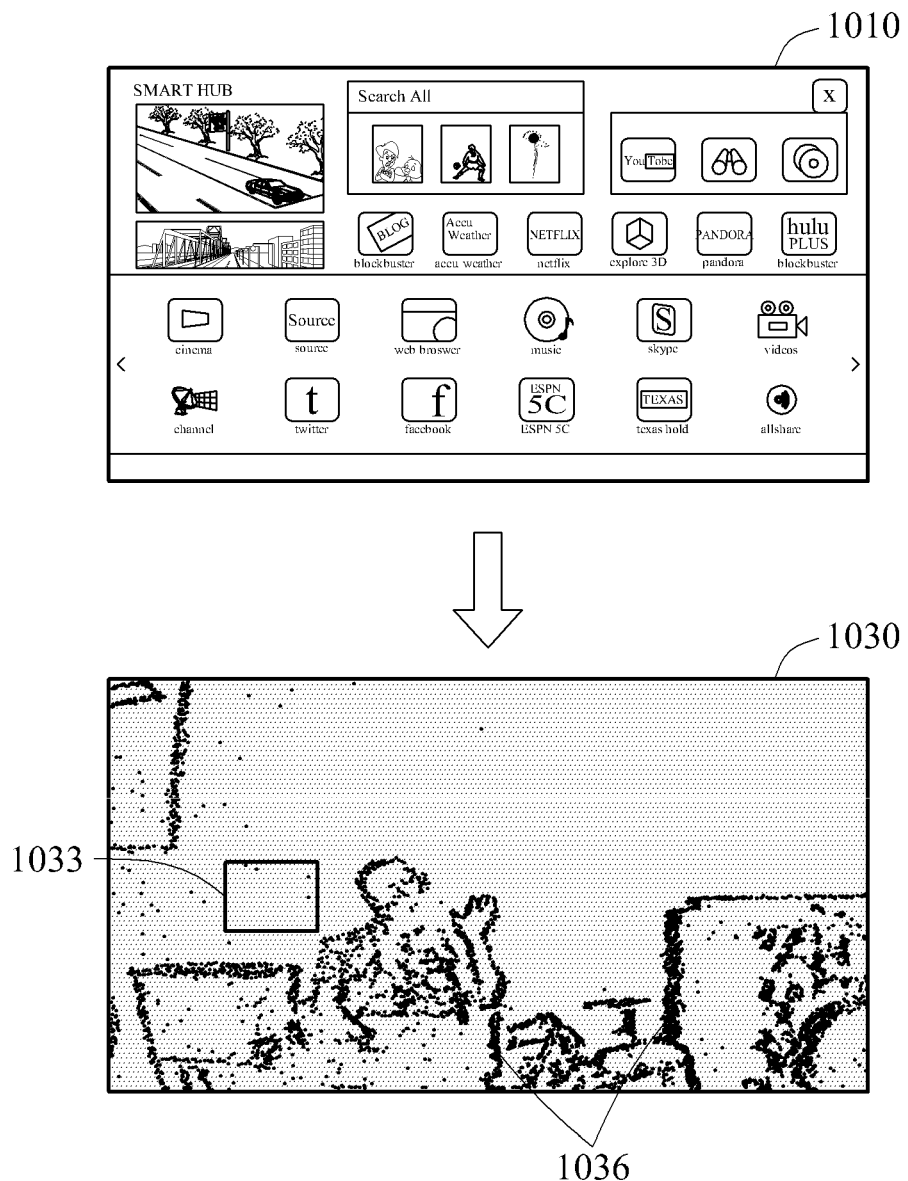
FIG. 10 is a diagram illustrating a screen visually provided to a user during feeding back of an error in gesture recognition according to an exemplary embodiment.

FIG. 10 is a diagram illustrating a screen visually provided to a user during feeding back of an error in gesture recognition according to an exemplary embodiment. FIG. 10 illustrates a playing screen 1010, and a screen 1030 overlaid on the playing screen 1010.

When an error in gesture recognition is detected, a detecting apparatus may visually provide a location of a first area 1033 that is being observed by the detecting apparatus using the screen 1030. The location of the first area 1033 may be represented as, for example, a box. Also, the detecting apparatus may visually provide a location and a surrounding environment 1036 of the user using the screen 1030.

Because an event-based sensor responds to a change in light, the event-based sensor may not sense a stationary background, and/or a location and a surrounding environment of a user who does not move. According to an exemplary embodiment, a location and a surrounding environment of a user may be provided using at least one of a static image generation scheme and a micro-vibration providing scheme even though there is no movement.

The static image generation scheme may be, for example, a scheme of extracting a static pattern corresponding to a location of a user and a surrounding environment of the user based on location information and time information included in an event signal output by an event-based sensor, in response to a dynamic input. The static image generation scheme will be further described with reference to FIGS. 11A through 15.

The micro-vibration providing scheme may be, for example, a scheme of providing a micro-vibration to an event-based sensor using a micro-vibration motor, to generate a dynamic input corresponding to a location of a user and a surrounding environment of the user.

The detecting apparatus may provide a moving area (for example, a hand of a user) and a stationary area (for example, a background area) to the user by distinguishing the areas using different colors. For example, the detecting apparatus may represent the moving area and the stationary area by green and white, respectively, and may provide a user with the moving area and the stationary area.

Exemplary embodiments may be implemented by, for example, an image input apparatus, an image-based gesture recognition software engine, a user feedback engine and a graphical user interface (GUI) included in an AV apparatus including a complementary metal-oxide semiconductor (CMOS) image sensor (CIS) camera, an infrared ray (IR) camera or a DVS camera.

For example, when an AV apparatus including a gesture recognition engine fails to recognize a gesture, a user may be enabled to instantly recognize an error in gesture recognition and an opportunity to fix the error may be provided. Thus, it is possible to enhance a reliability of gesture recognition in an AV-related product, for example, a smart TV.

Figure 11A:
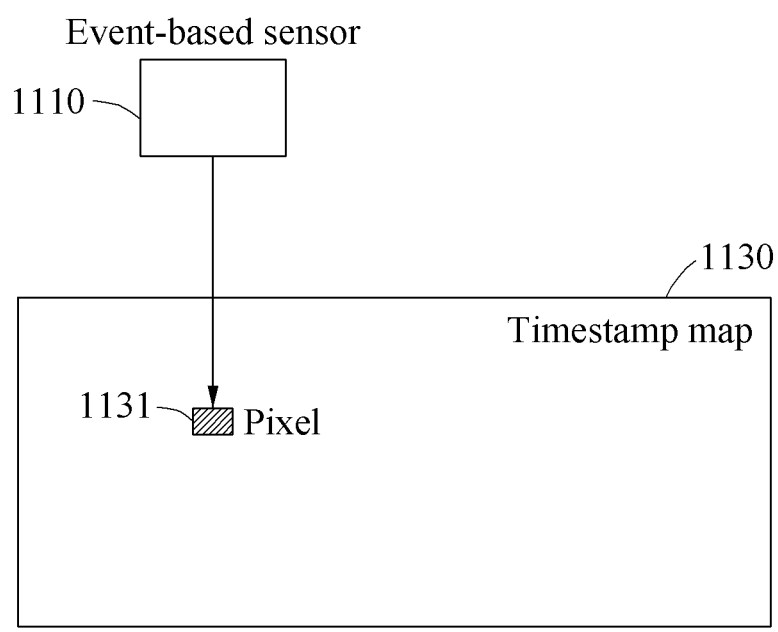
FIGS. 11A and 11B are diagrams illustrating a timestamp map used in a static image generation scheme according to an exemplary embodiment.
Figure 11B:
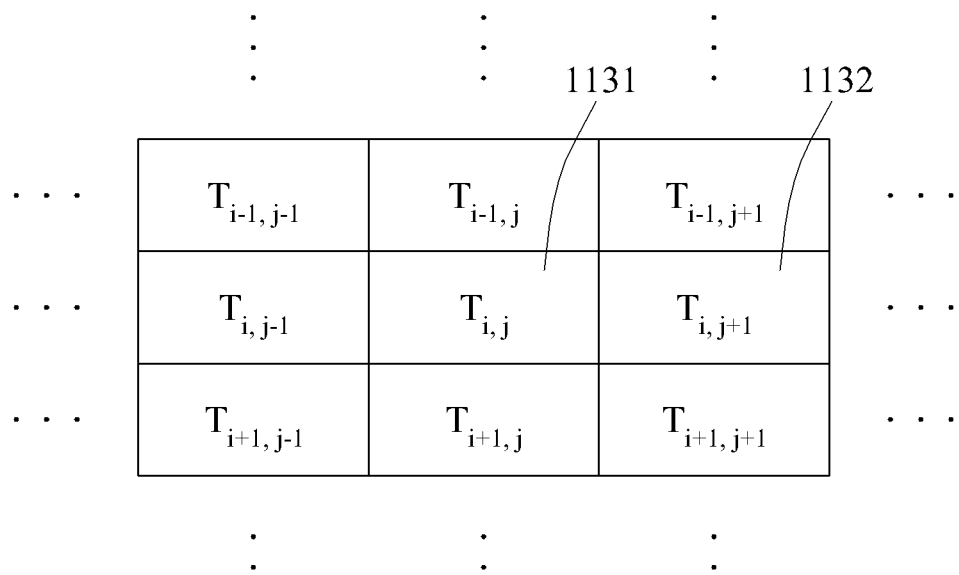

FIGS. 11A and 11B are diagrams illustrating a timestamp map 1130 according to an exemplary embodiment. Referring to FIGS. 11A and 11B, the timestamp map 1130 includes elements corresponding to pixels in an event-based sensor 1110. For example, an element 1131 stores a timestamp corresponding to a pixel located at (i, j) among pixels included in the event-based sensor 1110.

Each of the elements in the timestamp map 1130 may store a latest time at which a timestamp signal corresponding to each of the elements is received. For example, referring to FIG. 11B, a latest time at which a timestamp signal corresponding to the element 1131 located at (i, j) is received is $T_{i,j}$, and a latest time at which a timestamp signal corresponding to an element 1132 located at (i, j+1) is received is $T_{i,j+1}$. In the following description, a time at which a timestamp signal is received may be referred to as a "timestamp."

When a timestamp signal is received, the processor 130 may update the timestamp map 1130 based on the received timestamp signal. For example, the processor 130 may detect an element corresponding to the received timestamp signal among a plurality of elements included in the timestamp map 1130, and may update a value stored in the detected element to a timestamp at which the timestamp signal is received.

The processor 130 may store a time at which a new timestamp signal is received in a millisecond (ms) or less, or a microsecond (μs) or less, for each of the elements. The processor 130 may extract a static pattern based on a timestamp of a last timestamp signal received in each of the elements, regardless of a history of timestamp signals received over time. Thus, the processor 130 may extract the static pattern with a small amount of calculation and a small memory capacity. The static pattern will be further described with reference to FIG. 12.

The processor 130 may overwrite the received time information on a storage element corresponding to the received location information. For example, the processor 130 may discard a value stored in advance in the storage element, and may store the received time information in the storage element.

Exemplary embodiments may be modified to a scheme of generating a three-dimensional (3D) timestamp map, although not shown in the drawings, instead of a plurality of 2D timestamp maps. For example, a 3D timestamp map may store a pair of time information and depth information in an element corresponding to location information. The processor 130 may store time information and depth information in a storage element corresponding to location information.

In an example, the depth information may be quantized to depth regions. The depth regions may be predetermined. In this example, the processor 130 may generate a 3D timestamp map including a pair of latest time information and latest depth information for each of the depth regions. For example, when new depth information quantized to the same depth region as depth information of a pair of time information and the depth information that are stored in advance, is received, the processor 130 may overwrite a pair of new time information and the new depth information on a corresponding element.

Figure 12:
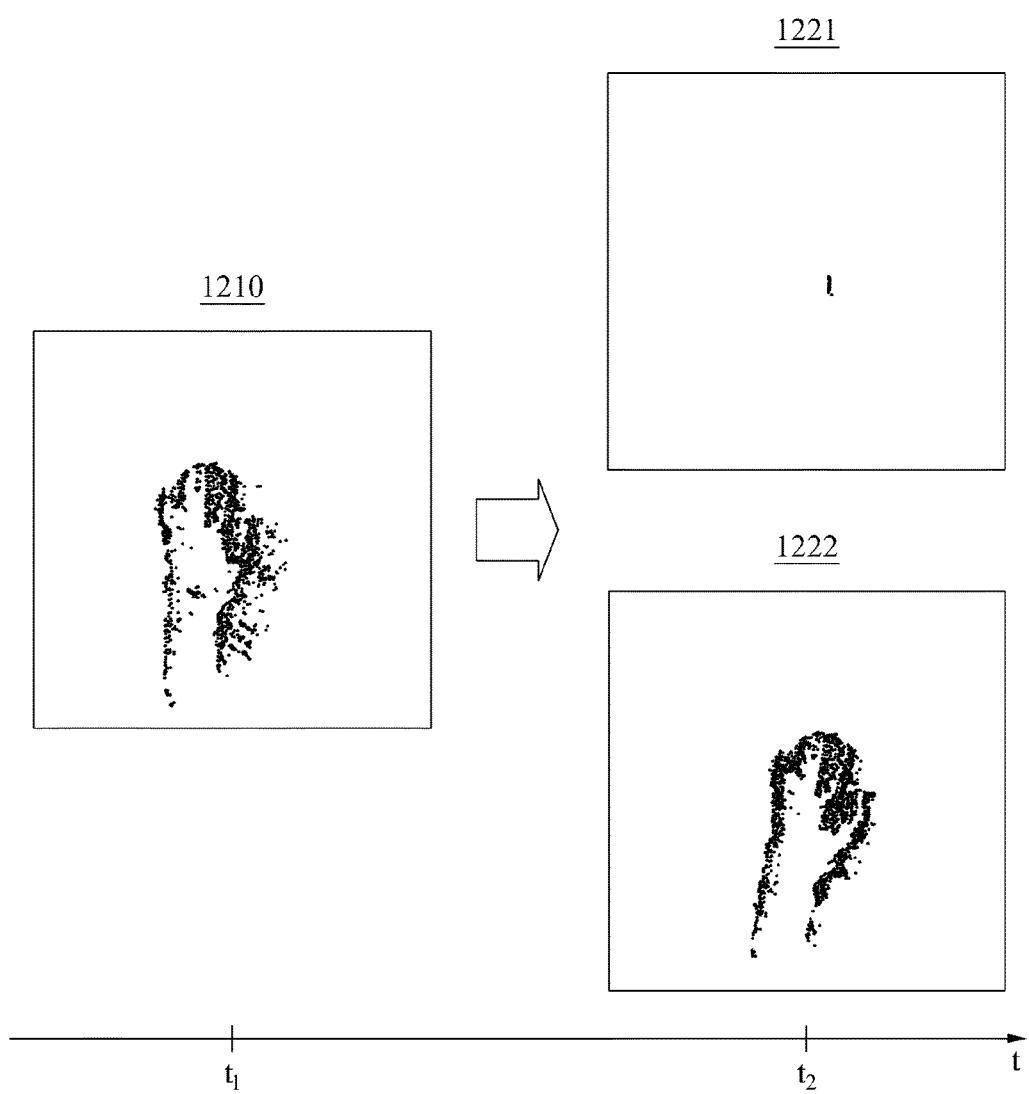
FIG. 12 is a diagram provided to explain a static pattern extraction result according to an exemplary embodiment.

FIG. 12 is a diagram provided to explain a static pattern extraction result according to an exemplary embodiment. FIG. 12 illustrates an output 1210 based on an event signal at a time $t_1$, an output 1221 based on an event signal at a time $t_2$, and a static pattern 1222 extracted based on the event signals. In FIG. 12, the time $t_1$ corresponds to a state in which an object is moving, and the time $t_2$ corresponds to a state in which the object is stationary. Since the event-based sensor 1110 may output an event signal in response to a dynamic input as described above, an output corresponding to the event signal may basically change from the output 1210 to the output 1221 when the object stops moving. However, when a pattern is extracted from a timestamp map based on a scheme that will be described below, the output 1210 may be reconstructed in the form of the static pattern 1222.

Referring back to FIG. 1, the processor 130 may extract a static pattern associated with a dynamic input based on the location information and the time information included in the event signal. For example, the processor 130 may extract the static pattern based on a ridge of a timestamp map. A timestamp of a last received timestamp signal may be stored in the timestamp map. For example, when an object is moving, various timestamps may be stored in the timestamp map. When times of the timestamps are assumed as altitudes, timestamps in a time slot may form a ridge. The time slot may be predetermined. The processor 130 may extract the ridge from the timestamp map. The ridge will be further described with reference to FIGS. 13 and 14.

Figure 13:
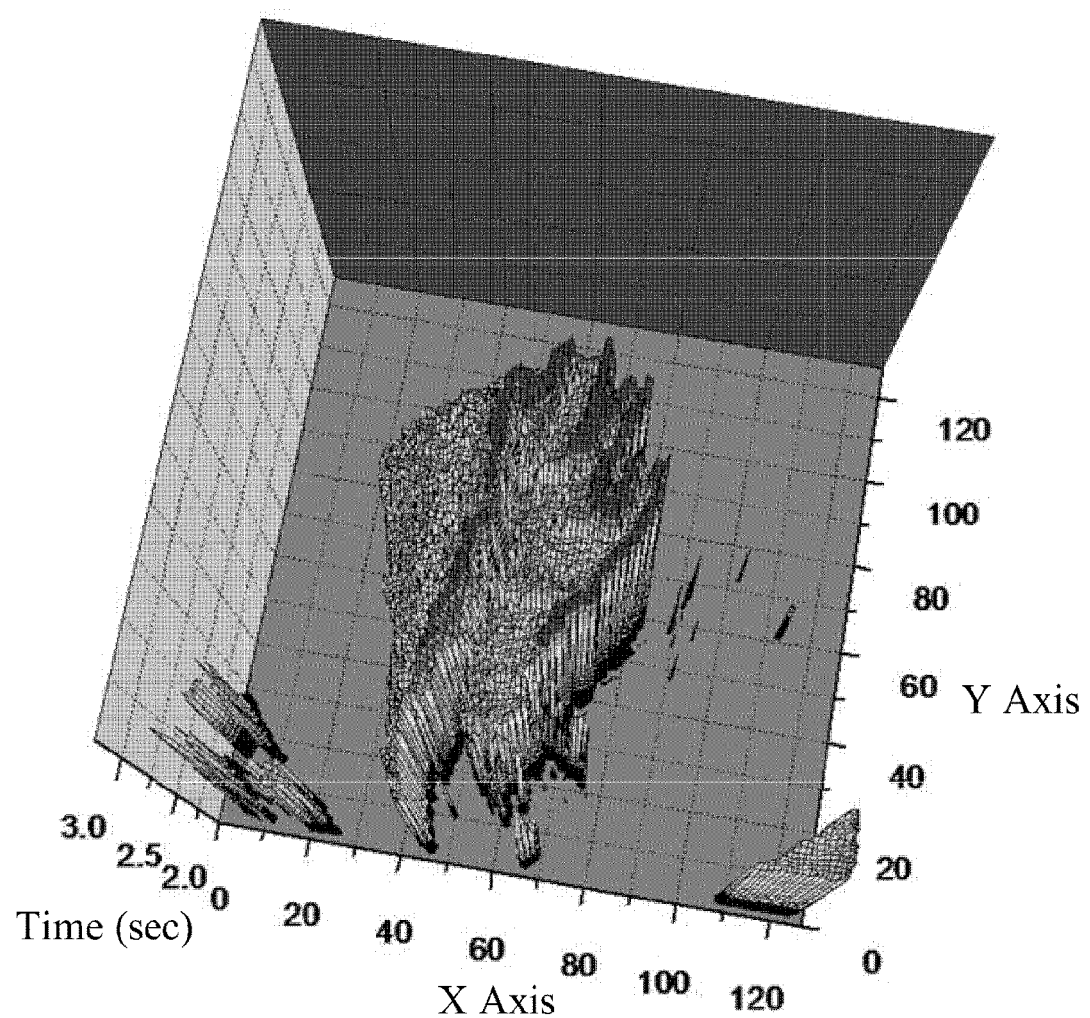
FIGS. 13 and 14 are diagrams provided to explain a ridge of a timestamp map according to an exemplary embodiment.
Figure 14:
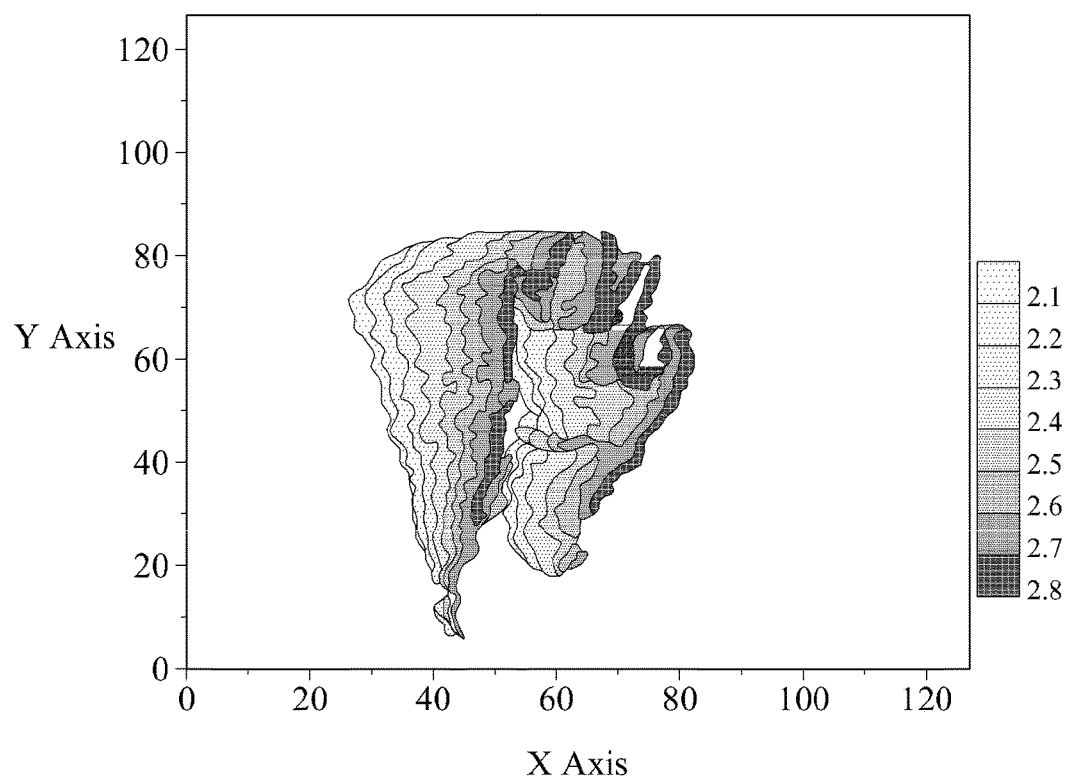

FIGS. 13 and 14 are diagrams provided to explain a ridge of a timestamp map according to an exemplary embodiment. FIG. 13 illustrates a timestamp map generated based on an event signal for a moving object. In FIG. 13, an X axis and a Y axis each represent location information of a pixel sensing a dynamic input, and a Z axis represents a timestamp. Accordingly, the location information may correspond to coordinates of the timestamp map, and time information may correspond to an altitude of the timestamp map. In FIG. 13, when the altitude increases, elements of the timestamp map may become dark. Accordingly, a darkest region of the timestamp map of FIG. 13 may correspond to a ridge.

FIG. 14 is a plane diagram of the timestamp map of FIG. 13. In FIG. 14, an X axis and a Y axis each represent location information of a pixel sensing a dynamic input. Accordingly, the location information may correspond to coordinates of the timestamp map. As shown in FIG. 14, even though a moving object stops, information on a movement of the object may remain in the timestamp map. The darkest region corresponding to the ridge in the timestamp map indicates information about a latest movement. The processor 130 may extract a static pattern based on the ridge of the timestamp map, and accordingly may provide information on an appearance of the object despite a stationary state of the object.

Referring back to FIG. 1, the processor 130 may extract a ridge based on location information and time information of a timestamp map. The processor 130 may determine the ridge using various schemes. In an example, the processor 130 may determine a ridge based on elements that store time information within a threshold time interval among a plurality of elements included in the timestamp map. In another example, the processor 130 may track a ridge so that a thickness of an edge included in the ridge may be equal to or less than a threshold thickness. Hereinafter, a process of determining a ridge will be further described with reference to FIG. 15.

Figure 15:
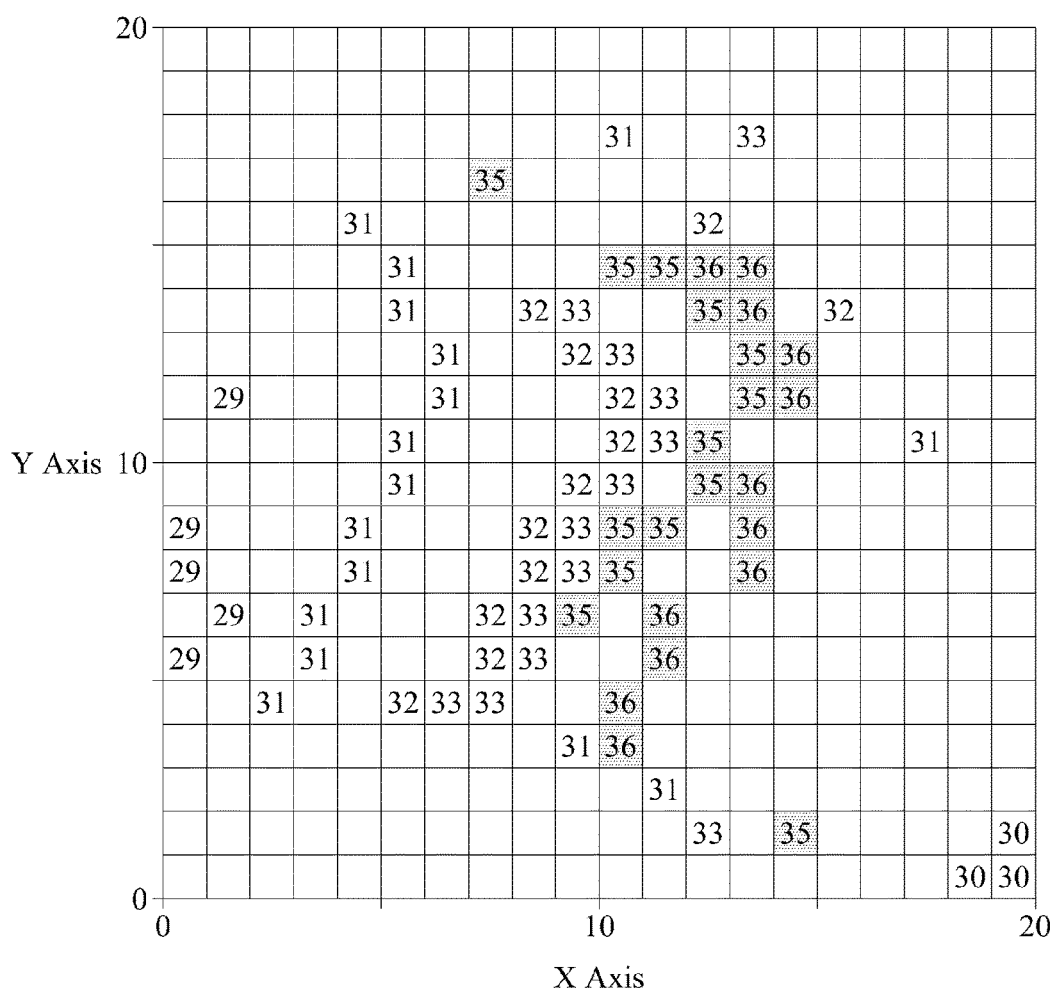
FIG. 15 is a diagram provided to explain a process of extracting a static pattern based on a threshold time interval according to an exemplary embodiment.

FIG. 15 is a diagram provided to explain a process of extracting a static pattern based on a threshold time interval according to an exemplary embodiment. FIG. 15 illustrates a 20×20 timestamp map with timestamps. The timestamp map of FIG. 15 shows that an object moved during a period from a time "29" to a time "36" and that a current time has elapsed past the time "36."

The processor 130 may determine a ridge based on elements that store time information within a threshold time interval among a plurality of elements included in a timestamp map. For example, the processor 130 may set the threshold time interval based on a current time. In this example, elements corresponding to timestamps within the threshold time interval based on the current time may be used to determine a ridge.

For example, the processor 130 may set the threshold time interval to a unit time of "5" from the current time. When the current time is set to a time "40," elements corresponding to timestamps, each having a value equal to or greater than "35," may be determined to form a ridge, as shown by the greyed out boxes in the timestamp map of FIG. 15.

The processor 130 may adjust a length of the threshold time interval based on a number of extracted elements. When an extremely large number of elements or a small number of elements exist during the threshold time interval, it may be difficult to recognize an appearance of an object. Accordingly, the processor 130 may adjust the length of the threshold time interval to a level suitable for recognition of the appearance of the object. For example, the processor 130 may set a reference value of a number of elements included in a static pattern, and may adjust the length of the threshold time interval based on the reference value. The reference value may include at least one of a minimum value and a maximum value. The processor 130 may determine a ridge based on elements storing time information within the threshold time interval with the adjusted length. When a minimum number of elements is set to "25," elements corresponding to timestamps "35" and "36" in the timestamp map of FIG. 15 may be determined to form a ridge, as the number of timestamps "35" and "36" (i.e., the number of greyed boxes in FIG. 15) is equal to 25.

The elements or components described herein may be implemented using hardware components, software components, or a combination thereof. For example, the hardware components may include microphones, amplifiers, band-pass filters, audio to digital converters, and processing devices. A processing device may be implemented using one or more general-purpose or special purpose computers, such as, for example, a processor, a controller and an ALU, a DSP, a microcomputer, an FPGA, a PLU, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the present inventive concept is not limited thereto. Instead, it will be appreciated by those skilled in the art that changes may be made to these exemplary embodiments without departing from the principles and spirit of the disclosure, the scope of which is defined by the claims and their equivalents.

What is claimed is:

1. A method of detecting an error in gesture recognition, the method comprising:
   sensing whether an effective gesture occurs in a first area for gesture recognition of a user;
   in response to an effective gesture not occurring in the first area, setting a second area and sensing an occurrence of an event due to a movement of the user, based on a result of the sensing in the first area, wherein the second area is an area for sensing an occurrence of the event for detecting the error in the gesture recognition; and
   detecting the error in the gesture recognition based on whether the occurrence of the event is sensed in the second area.

2. The method of claim 1, wherein the sensing whether the effective gesture occurs in the first area comprises:
   determining whether a movement occurs in the first area; and
   determining whether the movement is the effective gesture.

3. The method of claim 2, wherein the determining of whether the movement is the effective gesture comprises determining, using a pre-trained image classifier, whether the movement is the effective gesture.

4. The method of claim 1, wherein the setting the second area comprises:

identifying at least a part of a body of the user;

setting a reference point in the identified part of the body; and setting the second area based on the reference point.

5. The method of claim 4, wherein the identifying comprises identifying, using a pre-trained image classifier, at least a part of the body of the user.

6. The method of claim 1, wherein the setting the second area comprises:

identifying at least a part of a body of the user;

storing a movement trajectory by tracking a movement of the identified part of the body; and setting the second area based on the movement trajectory.

7. The method of claim 1, wherein the detecting comprises, when the occurrence of the event is sensed in the second area, detecting the error in the gesture recognition.

8. The method of claim 7, wherein the detecting comprises:

measuring a locomotion or a movement amount of an object corresponding to the event in the second area; and ignoring the occurrence of the event when the locomotion or the movement amount is greater than a first threshold or is less than a second threshold.

9. The method of claim 7, wherein the detecting comprises:

determining whether a movement of an object corresponding to the event in the second area has a regularity; and ignoring the occurrence of the event when the movement of the object is determined to have the regularity.

10. The method of claim 1, wherein the first area is smaller than the second area.

11. The method of claim 1, further comprising feeding back to the user the error in the gesture recognition.

12. The method of claim 11, wherein the feeding back comprises feeding back to the user the error in the gesture recognition based on at least one of an image message, a voice message and an animation.

13. The method of claim 11, further comprising, after the feeding back, resetting a location of a shaken object by scanning the second area.

14. The method of claim 11, further comprising, after the feeding back, visually providing the user with at least one of the first area, a location of the user and a surrounding environment of the user.

15. The method of claim 14, wherein the visually providing comprises:

providing the first area in a preset form; and providing the location and the surrounding environment of the user using at least one of a static image generation scheme and a micro-vibration providing scheme.

16. The method of claim 15, wherein the static image generation scheme is used to extract a static pattern corresponding to the location and the surrounding environment of the user based on location information and time information included in an event signal output by an event-based sensor in response to a dynamic input.

17. The method of claim 15, wherein the micro-vibration providing scheme is used to provide a micro-vibration to an event-based sensor, to generate a dynamic input corresponding to the location and the surrounding environment of the user.

18. The method of claim 14, wherein the visually providing comprises overlaying a playing screen with at least one of the first area, the location of the user and the surrounding environment of the user, or visually providing at least one of the first area, the location of the user and the surrounding environment of the user through a screen change.

19. A computer program embodied on a non-transitory computer readable medium, the computer program being configured to control a processor to perform the method of claim 1, through a combination with hardware.

20. An apparatus for detecting an error in gesture recognition, the apparatus comprising:

a sensor configured to sense whether an effective gesture occurs in a first area for gesture recognition of a user; and a processor configured to, in response to an effective gesture not occurring in the first area, set a second area and to sense an occurrence of an event in the second area due to a movement of the user based on a result of the sensing in the first area, and configured to detect an error in the gesture recognition based on whether the occurrence of the event is sensed in the second area, wherein the second area is an area for sensing an occurrence of the event for detecting the error in the gesture recognition.

21. An apparatus for detecting an error in gesture recognition, the apparatus comprising:

a sensor; and at least one microprocessor configured to control the sensor to:

sense whether a gesture by a first body part occurs in a first area that is a portion of a field of view (FOV) of the sensor; and when a gesture is not sensed in the first area, redefine the first area based on a sensed position of a second body part that is larger than the first body part and re-sense whether a gesture occurs in the redefined area; and detect an error when a gesture is sensed in the redefined area, wherein the redefined area is an area for sensing an occurrence of the event for detecting the error in the gesture recognition.

22. The apparatus of claim 21, wherein the redefined area is a portion of the first area.

23. The apparatus of claim 21, wherein the redefined area is a portion of the FOV different than the first area.

24. The apparatus of claim 21, wherein the first body part is a hand of a user, and the second body part is a head of the user.

25. The apparatus of claim 21, wherein the first area is redefined based on a movement trajectory of the second body part.

* * * * *